United States Patent Office 2,993,901
Patented July 25, 1961

2,993,901
BENZANTHRONE ANTHRAQUINONE ACRIDINES AS DYESTUFFS
Isaiah Von, Somerville, and William Baptist Hardy, Bound Brook, N.J., assignors to American Cyanamid Company, New York, N.Y., a corporation of Maine
No Drawing. Filed June 8, 1953, Ser. No. 360,325
11 Claims. (Cl. 260—274)

This invention relates to new vat dyestuffs of the benzanthrone anthraquinone acridine series.

Dyestuffs for the dyeing of military uniforms present a serious problem. The enormous increase in fire power in modern warfare makes it imperative for soldiers to blend into the terrain so that they are either unobserved or present relatively poor targets. The art of camouflage resulted in the development of uniforms having colors which blend into the average landscape. During the Second World War, observation by means of infrared radiation completely changed the problem of camouflage because, while dyes of excellent fastness and dull drab shades under visible light were generally used for the dyeing of uniforms, all of the fast dyes with otherwise desirable properties showed high reflectance in the infrared and therefore soldiers wearing uniforms dyed with these dyes when observed under infrared radiation, for example by means of devices such as snooperscopes and sniperscopes, stood out against average terrain making discovery easy and presenting excellent targets.

Extensive investigations have shown that to be effective under infrared observation, dyed fabrics must show an infrared reflectance which is relatively low, preferably below 25%, but which of course should not be too low. In other words in average terrain, a soldier to be effectively concealed or to present a poor target should appear no lighter than the background and while it is undesirable that a soldier should appear much darker, any difference in infrared reflectance from that of the terrain should be on the darker rather than on the lighter side.

There are known some dyes, for example some sulfur dyes, which exhibit low infrared reflectance. These dyes, however, have such inferior fastness to light and to the rather drastic washing conditions in the field that they are not practical. On the other hand, vat dyes which show satisfactory light and wash fastness have, in the past, also shown high infrared reflectance. The need for vat dyes of low infrared reflectance and satisfactory fastness properties has therefore been unfulfilled, both for use as the only dyes for uniforms and for use in blends with small amounts of other dyes of higher infrared reflectance.

According to the present invention we have found that certain benzanthrone anthraquinone acridine dyestuffs combine low infrared reflectance with light and wash fastness properties adequate for military use. The dyes are derivatives of 4-amino-Bz-1'-(alphaanthraquinonylamino) benzanthrone-2,2'-acridine. The ring has the following structure:

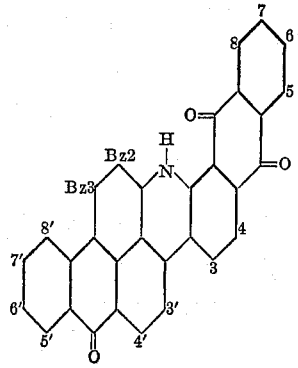

For simplicity, in the specification this ring will be referred to as the benzanthrone anthraquinone acridine. This benzanthrone anthraquinone acridine ring is known. However, we have found that when there is a benzoylamino group attached to the 4 carbon atom of the anthraquinone nucleus and there are one or more sulfonyl groups attached to the benzoyl group, vat dyes result which not only have a desirable low infrared reflectance, but also have excellent characteristics with regard to fastness to light, washing, bleaching and other treatments to which military equipment is ordinarily subjected. Just why these comparatively small changes in terms of molecular weight on a relatively large molecule should produce such a great difference in its practical properties as a military vat dye is not known and no theory is advanced why this should be.

The dyestuffs of the present invention may be represented by the following type formula:

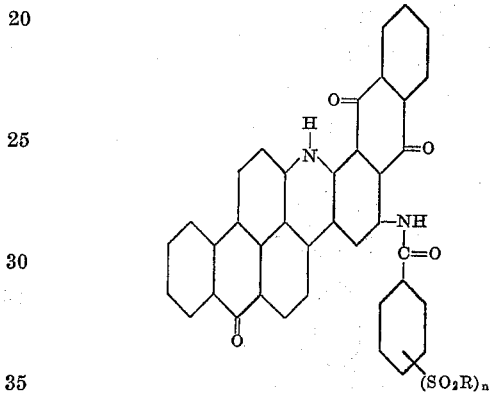

in which R is an alkyl or aryl group of less than seven carbon atoms and $n$ is an integer greater than 0 and less than 3.

The dyes of the present invention may be prepared simply by condensing a Bz-1-halogeno-benzanthrone with either 1,4-diaminoanthraquinone or 1-amino-4-benzoylaminoanthraquinone and fusing the resulting anthrimides in alcoholic caustic potash. The compounds produced, regardless of whether the anthrimide contained the 4-benzoylamino group or the 4-amino group produced the same compound as the benzoyl group is split off in the fusion. The compound produced has the formula:

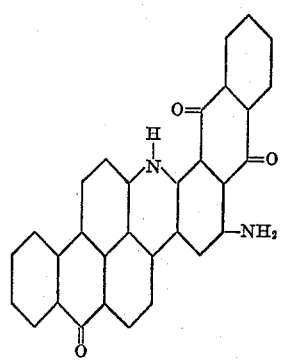

The intermediates containing the 4-amino group are then acylated using benzoyl halides substituted by one or two sulfonyl groups.

It is an advantage of the present invention that the processes of preparing the new dyestuffs are simple and the yields in the various steps are good, in some cases substantially quantitative.

In the specific examples to follow, the acylation is effected in general with the halides of the various benzoic acids in question, but it is entirely feasible to use the anhydrides instead of the halides where this procedure is preferred. Typical acylating agents therefore include the anhydrides or acid chlorides of such acids as o-, m-, and p-methylsulfonyl benzoic acids, p-butylsulfonyl benzoic acid, 3,5-dimethylsulfonyl benzoic acid, m-ethylsulfonyl benzoic acid, p-phenylsulfonyl benzoic acid, and the like.

Many of the dyes of the present invention dye cellulosic and other fibers olive shades which are visually suitable for much military material. Obviously, of course, mixtures of the dyes may be used for shade adjustment. The dyes of the present invention may also be used with other dyes, either in single dyeing operations with a blend of dyes or in successive dyeings. This is made possible because the infrared reflectance of the dyes of the present invention is so low that in many cases the final shade will have an infrared reflectance falling within the desired range. Of course, where the other dyes have very high infrared reflectance, they must be used in sufficiently small amounts so that the total reflectance of the dyed material is satisfactory for blending in with average terrain. While the use of the dyes of the present invention with other dyes is an important field of the utility, dyeing processes using one or more dyes of the present invention with other dyes and fabrics dyed therewith are not claimed in the present application, forming the subject matter of the co-pending application of Mario Scalera and William Baptist Hardy, Serial No. 360,331, filed June 6, 1953.

The invention will be illustrated in greater detail in the following specific examples, in which the parts are by weight unless otherwise specified.

*Example 1*

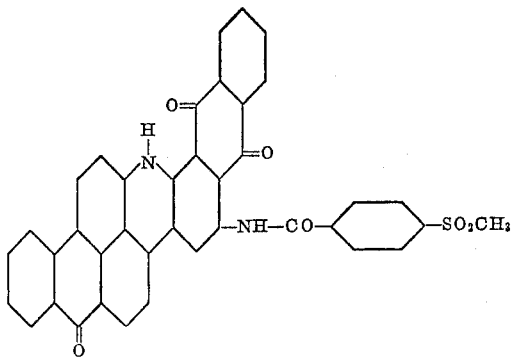

23.2 parts of 4-aminobenzanthrone anthraquinone-acridine, 300 parts of nitrobenzene, 2.5 parts of pyridine, and 24 parts of p-methylsulfonylbenzoyl chloride are stirred at 150° C. until acylation is substantially complete. The mixture is diluted with 1,000 parts of alcohol and the precipitated product is filtered and washed with alcohol. It is then extracted with 250 parts of boiling pyridine followed by filtration and washing with alcohol. The yield of dyestuff is excellent. The product dyes cotton an olive shade of good light fastness and low infrared reflectance.

*Example 2*

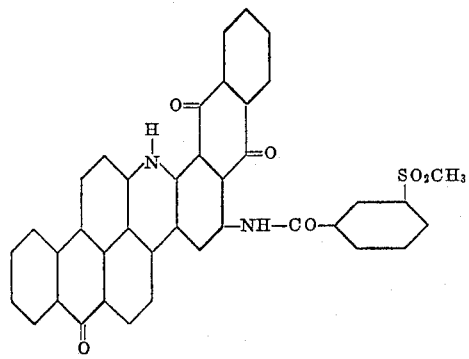

The procedure of Example 1 is followed, substituting m-methylsulfonylbenzoyl chloride for the para isomer used in that example. The product dyes cotton an olive shade of good light fastness and low infrared reflectance.

*Example 3*

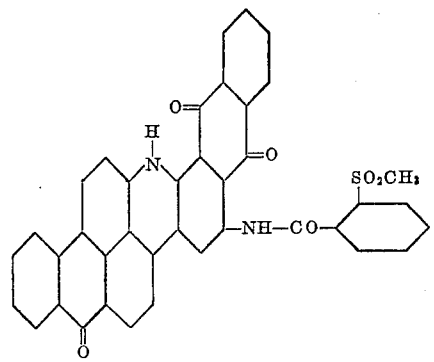

The procedure of Example 1 is followed using o-methylsulfonylbenzoyl chloride in place of the para isomer used in that example. The product dyes cotton an olive shade of low infrared reflectance and good fastness properties.

*Example 4*

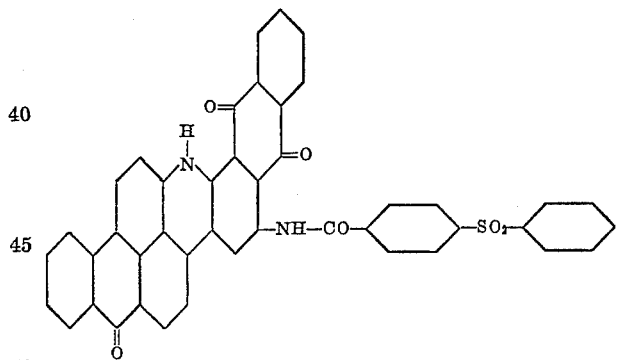

The procedure of Example 1 is followed using 39 parts of p-phenylsulfonylbenzoyl chloride in place of p-methylsulfonylbenzoyl chloride used in that example. The product dyes cotton an olive shade of good fastness and infrared reflectance properties.

*Example 5*

23 parts of 3,5-dimethylmercaptobenzoic acid (J.A.C.S., 1930, 1) are dissolved in a solution of 10 parts of sodium hydroxide in 450 parts of water. 57 parts of potassium permanganate are added and the reaction mixture is stirred for one hour at 65–70° C. The reaction mixture is then filtered and upon acidification of the filtrate, 3,5-dimethylsulfonylbenzoic acid, a white solid melting at 283–285° C., is precipitated in good yield. 18 parts of this acid are added to 320 parts of thionyl chloride and this mixture is refluxed for three hours. The excess thionyl chloride is distilled off in vacuo. The residue is triturated with n-hexane. The solid formed is removed by filtration, washed and dried. This product, which is 3,5-dimethylsulfonylbenzoyl chloride, melts at 186–189° C.

Example 6

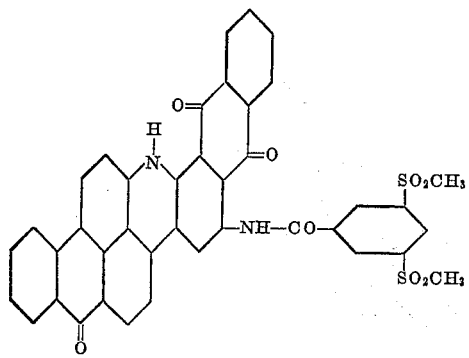

The procedure of Example 1 is followed using 41 parts of 3,5-dimethylsulfonylbenzoyl chloride, prepared as described in Example 5. The resulting product dyes cotton an olive-brown shade of good fastness properties and low infrared reflectance.

Example 7

34 parts of m-(n-butylmercapto)benzoic acid, prepared by the procedure of Donleavy and English (J.A.C.S. 62, 220), are dissolved in a solution of 7 parts of sodium hydroxide in 350 parts of water. To this are added 40 parts of potassium permanganate and the reaction mixture is stirred at 65–70° C. until the oxidation is complete. The reaction mixture is filtered and the resulting filtrate is acidified to precipitate m-(n-butylsulfonyl)benzoic acid, which melts at 122–124° C.

Example 8

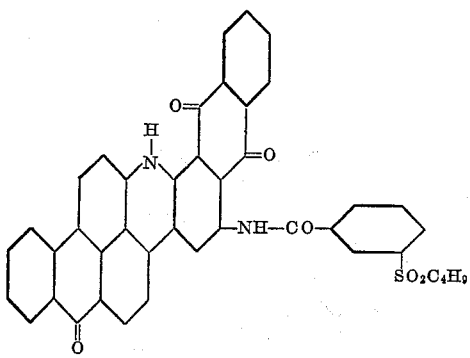

24 parts of the acid described in Example 7 are converted to the corresponding acid chloride by the usual treatment with thionyl chloride and this acid chloride is used in the procedure of Example 1 in place of p-methylsulfonylbenzoyl chloride used in that example. The product so obtained dyes cotton an olive shade of low infrared reflectance and good light and wet fastness properties.

We claim:
1. Compounds having the formula:

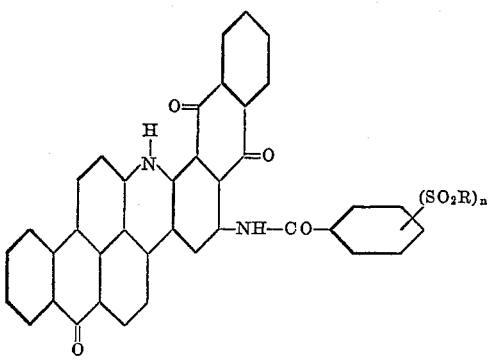

in which R is selected from the group consisting of a phenyl radical and an alkyl radical of less than seven carbon atoms and $n$ is a positive integer greater than 0 and less than 3.

2. Compounds having the formula:

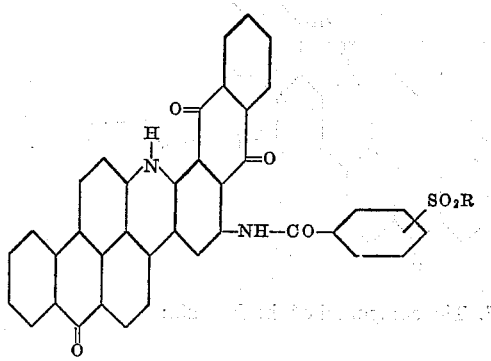

in which R is an alkyl group of less than seven carbon atoms.

3. Compounds of the formula:

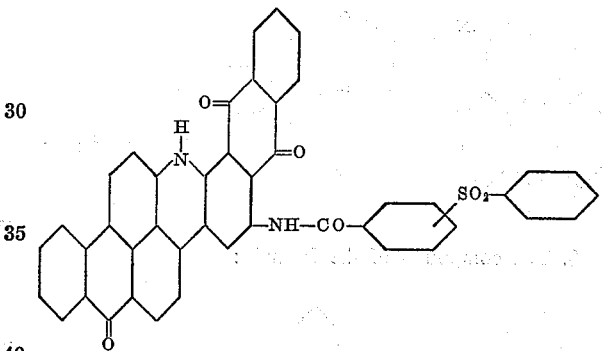

4. Compounds of the formula:

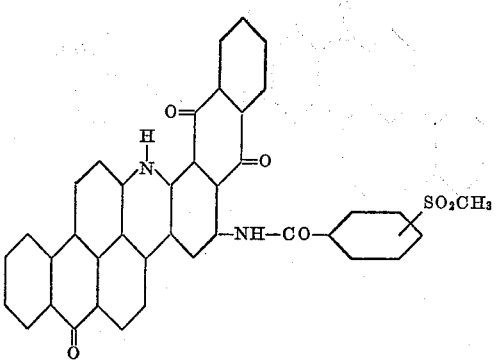

5. Compounds of the formula:

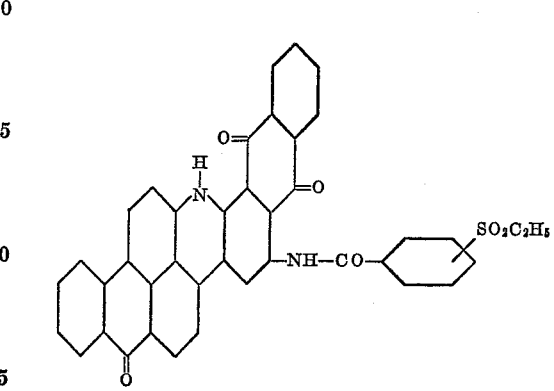

6. Compounds of the formula:
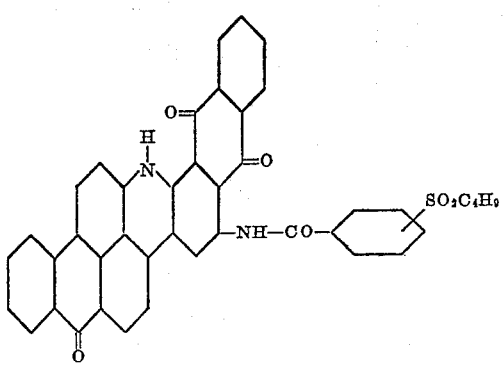
7. The compound of the formula:
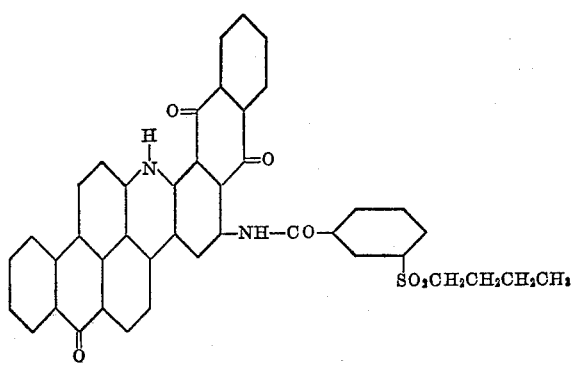
8. The compound of the formula:
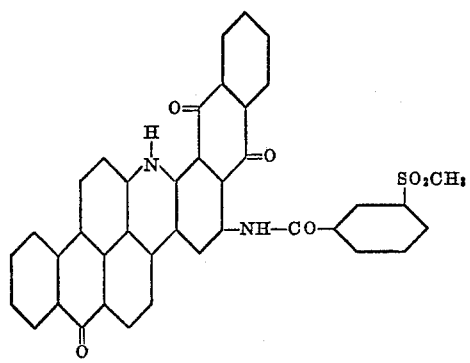
9. The compound of the formula:
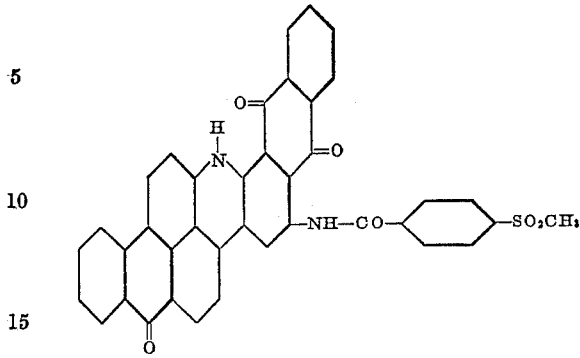
10. The compound of the formula:
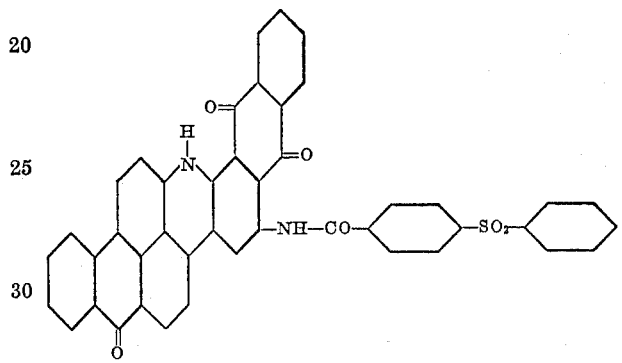
11. The compound of the formula:
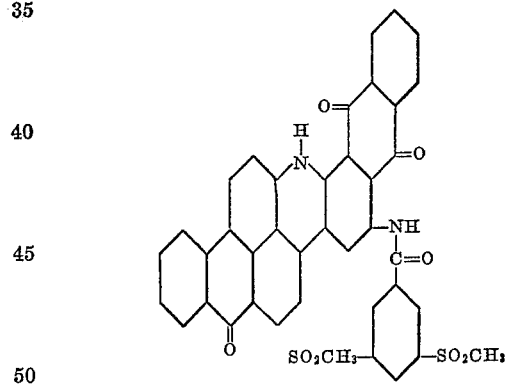
No references cited.